(12) United States Patent
Fricke et al.

(10) Patent No.: US 7,380,819 B2
(45) Date of Patent: Jun. 3, 2008

(54) AIR-BAG

(75) Inventors: Conrad Fricke, München (DE);
Jonathan Moore, Franham (GB);
Richard White, Waterlooville (GB)

(73) Assignee: Autoliv Development AB, Vargarda (SE)

( * ) Notice: Subject to any disclaimer, the term of this patent is extended or adjusted under 35 U.S.C. 154(b) by 296 days.

(21) Appl. No.: 10/520,702

(22) PCT Filed: Jun. 4, 2003

(86) PCT No.: PCT/SE03/00909

§ 371 (c)(1),
(2), (4) Date: Sep. 12, 2005

(87) PCT Pub. No.: WO2004/007250

PCT Pub. Date: Jan. 22, 2004

(65) Prior Publication Data

US 2006/0145458 A1    Jul. 6, 2006

(30) Foreign Application Priority Data

Jul. 12, 2002  (GB)  ................. 0216211.3

(51) Int. Cl.
*B60R 21/26* (2006.01)
(52) U.S. Cl. .................. 280/736; 280/742; 280/730.2
(58) Field of Classification Search ............ 280/730.2, 280/740, 742, 728.2, 743.1, 729, 736
See application file for complete search history.

(56) References Cited

U.S. PATENT DOCUMENTS

| | | | |
|---|---|---|---|
| 6,073,961 A | 6/2000 | Bailey et al. | |
| 6,199,898 B1 | 3/2001 | Masuda et al. | |
| 6,203,058 B1 | 3/2001 | Elqadah et al. | |
| 6,227,561 B1 | 5/2001 | Jost et al. | |
| 6,231,073 B1 | 5/2001 | White, Jr. | |

(Continued)

FOREIGN PATENT DOCUMENTS

DE    198 50 448    5/2000

(Continued)

*Primary Examiner*—Ruth Ilan
*Assistant Examiner*—Drew J. Brown
(74) *Attorney, Agent, or Firm*—Brinks Hofer Gilson & Lione

(57) ABSTRACT

An air-bag arrangement is disclosed, which preferably takes the form of an inflatable curtain. The arrangement comprises a single inflatable element (2) and a gas generator (10), which is configured to inflate the inflatable element (2). The inflatable element (2) defines at least two inflatable chambers (5,6). A gas-supply duct (11) is provided which has an end outlet aperture (19) formed through an end wall 18 of the gas-supply duct (11) so as to have a diameter smaller than the bore of the gas-supply duct (11). The gas-supply duct (11) also has at least one side outlet aperture (20) formed through the side wall of the gas-supply duct (11) at a position generally adjacent the end outlet aperture (19). The side outlet aperture (20) is configured to direct gas out of the gas-supply duct (11) in a direction substantially orthogonal to the direction of gas directed to the end outlet aperture (19). The gas-supply duct (11) is arranged so that gas exiting through the end outlet aperture (19) is directed to one of the chambers (5), whilst gas exiting through the side outlet aperture (20) is directed to the other chamber (6).

9 Claims, 3 Drawing Sheets

U.S. PATENT DOCUMENTS

| | | |
|---|---|---|
| 6,237,941 B1 | 5/2001 | Bailey et al. |
| 6,273,456 B1 | 8/2001 | Heigl |
| 6,276,712 B1 | 8/2001 | Welch et al. |
| 6,293,581 B1 | 9/2001 | Saita et al. |
| 6,299,199 B1 | 10/2001 | Bowers et al. |
| 6,334,625 B1 | 1/2002 | Pausch et al. |
| 6,336,654 B1 | 1/2002 | Stein et al. |
| 6,409,211 B1 | 6/2002 | Sheng et al. |
| 6,428,037 B1 | 8/2002 | Bakhsh et al. |
| 6,431,587 B1 | 8/2002 | O'Docherty |
| 6,450,529 B1 | 9/2002 | Kalandek et al. |
| 6,457,740 B1 | 10/2002 | Vaidyaraman et al. |
| 6,464,250 B1 | 10/2002 | Faigle et al. |
| 6,705,636 B2 * | 3/2004 | Takahara ............. 280/728.2 |
| 6,877,771 B2 * | 4/2005 | Weber ..................... 280/742 |
| 7,021,652 B2 * | 4/2006 | Kumagai et al. ......... 280/729 |
| 2001/0019201 A1 | 9/2001 | Masuda et al. |
| 2001/0045729 A1 | 11/2001 | Mueller |
| 2002/0014762 A1 | 2/2002 | Bakhsh et al. |
| 2002/0020991 A1 | 2/2002 | Tanase et al. |
| 2002/0036395 A1 | 3/2002 | Bakhsh et al. |
| 2002/0036396 A1 | 3/2002 | Fischer |
| 2002/0056974 A1 | 5/2002 | Weber |
| 2002/0105173 A1 | 8/2002 | Saderholm et al. |
| 2002/0105174 A1 | 8/2002 | Tanase et al. |
| 2002/0125693 A1 | 9/2002 | Alsup et al. |
| 2002/0140211 A1 | 10/2002 | Takahara |
| 2002/0163167 A1 | 11/2002 | Hill |
| 2002/0175502 A1 | 11/2002 | Tesch et al. |
| 2002/0195804 A1 | 12/2002 | Hess et al. |
| 2003/0090095 A1 * | 5/2003 | Takahara ................. 280/740 |
| 2005/0062266 A1 * | 3/2005 | Steimke et al. ......... 280/730.2 |

FOREIGN PATENT DOCUMENTS

| | | |
|---|---|---|
| DE | 198 50 448 A1 | 5/2000 |
| DE | 10021576 A1 | 5/2000 |
| DE | 200 15 065 | 2/2001 |
| DE | 200 16 717 U1 | 3/2001 |
| EP | 0832795 A1 | 1/1998 |
| EP | 1228930 A2 | 8/2002 |
| EP | 1 238 865 | 9/2002 |
| GB | 2327066 A | 7/1997 |
| JP | 2000-335356 A | 5/2000 |
| JP | 2000-355261 A | 12/2000 |
| JP | 2001-270413 A | 2/2001 |
| JP | 2001-251737 | 8/2001 |
| JP | 2001-328503 A | 11/2001 |
| JP | 2002-503581 A | 2/2002 |
| JP | 2002-114125 A | 4/2002 |
| JP | 2002-200959 A | 7/2002 |
| JP | 2002-522287 A | 7/2002 |
| JP | 2003-320920 A | 11/2003 |
| WO | WO 99/42333 | 8/1999 |
| WO | WO 03/018372 | 3/2003 |
| WO | WO 03/051679 | 6/2003 |
| WO | WO 03/051680 | 6/2003 |
| WO | WO 03/078214 | 9/2003 |

* cited by examiner

FIG_1

AIR-BAG

CROSS REFERENCE TO RELATED APPLICATION

This application claims priority to GB 0216211.3, filed Jul. 12, 2002 and PCT/SE2003/000909, filed Jun. 4, 2003.

BACKGROUND OF THE INVENTION

The present application relates to an air-bag, and more particularly relates to an air-bag arrangement comprising a gas-supply duct.

It has been proposed previously to provide various forms of airbags with a substantially rigid gas-supply duct configured to direct a flow of gas from an inflator or gas generator through specific regions of the air-bag which are to be inflated.

For example, various designs of "inflatable curtain" have been proposed. Such an inflatable curtain is an air-bag which is initially stored within the roof lining of a motor vehicle immediately above the door openings, the air-bag inflating in response to a signal from an appropriate sensor to form a "curtain" lying adjacent a side window of the vehicle. Frequently, an air-bag of this type comprises two discrete chambers for inflation. One chamber being configured to lie adjacent the front side-window of the vehicle, and the other chamber being configured to lie adjacent the rear-side window of the vehicle upon inflation of the air-bag. In order to use a single inflator or gas generator to inflate both discrete chambers of the air-bag, it is convenient to arrange the inflator or gas generator in the region of the "B-pillar" of the motor vehicle structure, i.e. the pillar extending vertically upwardly between the front and rear side windows of the vehicle.

As will therefore be appreciated, in order to ensure proper inflation of both of the discrete chambers of the abovementioned inflatable curtain, gas generated by the single gas generator must be directed towards each discrete chamber. However, because an inflatable curtain-type air-bag must be inflated in a very short period of time if it is to be of value in a side impact situation, the gas generator must produce a very large volume of gas in a very short period of time. The resultant flow of gas is very aggressive and can damage the inflatable curtain if not carefully directed into the interior of the inflatable curtain. It is known to provide a substantially rigid gas-supply duct, extending from the single gas generator, in order to direct the flow of gas into the interior of the inflatable curtain.

DE 20016717U1 discloses an arrangement comprising a pair of divergent gas-supply ducts, each configured to direct gas from a common gas generator towards a respective region of the inflatable curtain. However, the provision of two gas supply ducts adds complexity and expense to the arrangement.

DE 19850448A discloses a single gas supply duct configured to provide a flow of gas along two flow paths, into separate air-bags. The two flow paths are substantially perpendicular to one another.

The present invention seeks to provide an improved air-bag arrangement.

SUMMARY OF THE INVENTION

According to the present invention, there is provided an air-bag arrangement comprising a single inflatable element and a gas generator configured to inflate the inflatable element. The inflatable element defines at least two chambers for inflation by gas from the gas generator. The air-bag arrangement further comprises a gas-supply duct having an end-outlet aperture formed through an end-wall of the gas-supply duct so as to have a diameter smaller than the bore of the gas-supply duct. At least one side-outlet aperture is formed through a side-wall of the gas-supply duct at a position substantially adjacent the end-outlet aperture. Each side-outlet aperture is configured to direct gas out of the gas-supply duct in a direction substantially orthogonal to the direction of gas directed through the end-aperture, wherein the gas-supply duct is arranged to direct gas from the gas generator to one of two chambers through the end-outlet aperture, and from the gas generator to the other of the two chambers through at least one side-outlet aperture.

Preferably, the gas-supply duct comprises a plurality of side-outlet apertures formed in the side-wall.

Advantageously, each plurality of side-outlet apertures is arranged to direct gas out of the gas-supply duct in a direction non-parallel with the direction of gas directed through one or more side-outlet aperture.

Conveniently, the inflatable element defines a gas-flow passage interconnecting the two chambers, and wherein at least one outlet aperture is arranged to direct gas along the flow-passage.

Preferably, one or more outlet apertures is arranged to direct gas along the flow passage is arranged to direct the gas in a direction angle at approximately 45° to the axis of the flow passage.

Advantageously, the inflatable element is in the form of an inflatable curtain.

Conveniently, the gas-supply duct has a curved or bent configuration.

Preferably, the gas-supply duct has two linear regions, the axis of one linear region making an angle of approximately 45° to the axis of the other linear region.

BRIEF DESCRIPTION OF THE DRAWINGS

So that the invention may be more readily understood, and so that further features thereof may be appreciated, the invention will now be described, by way of example, with reference to the accompanying drawings, in which.

DETAILED DESCRIPTION OF THE INVENTION

Figure 1:
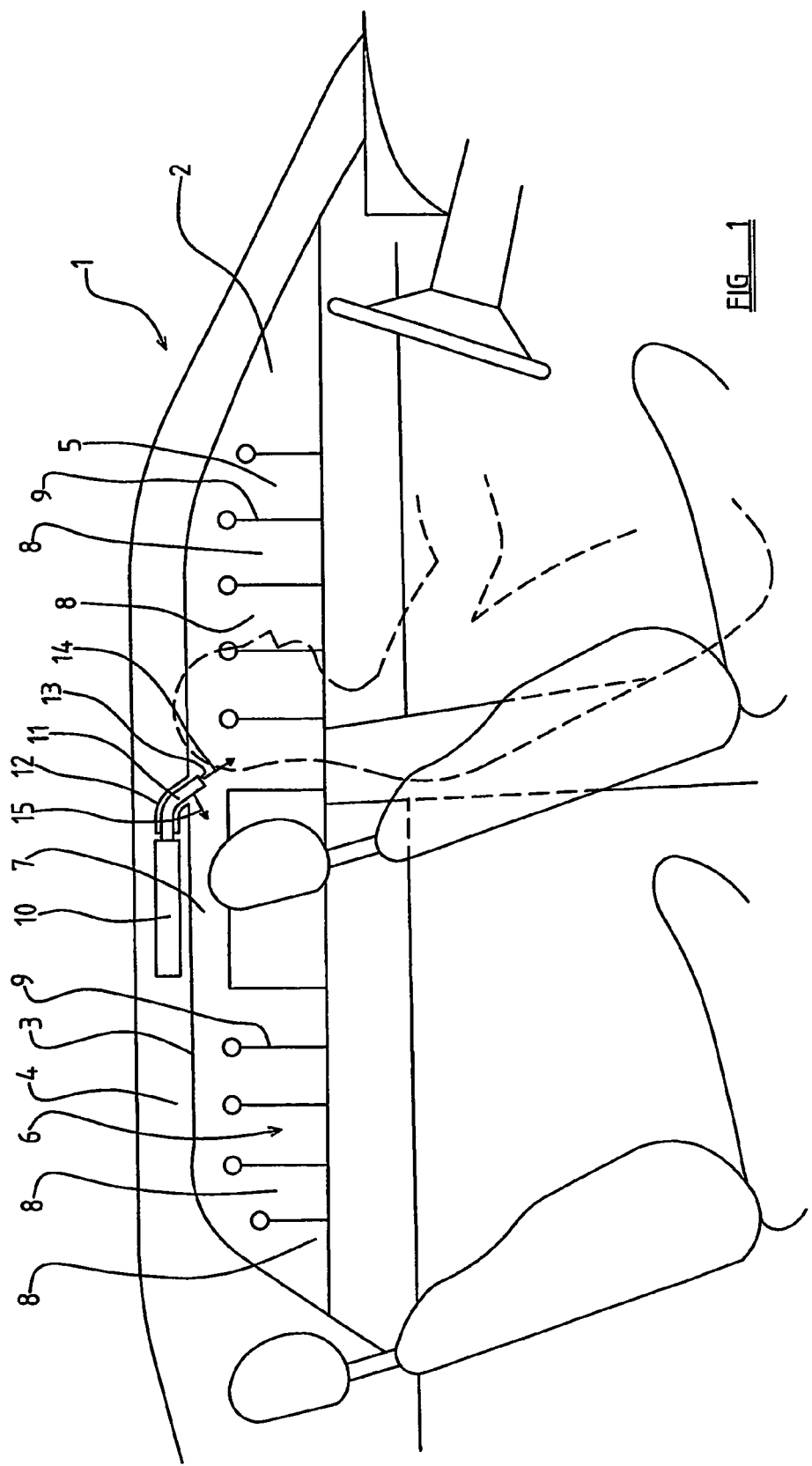
FIG. 1 is a side view of an air-bag arrangement in accordance with the present invention, illustrating the arrangement fully inflated, to provide an inflatable curtain within a motor vehicle.

Referring initially to FIG. 1 of the accompanying drawings, an air-bag arrangement 1 is illustrated in the form of an inflatable curtain for use in a motor vehicle. The air-bag arrangement comprises an inflatable element 2 which is secured along its uppermost peripheral edge 3 to the roof structure 4 of the motor vehicle. The inflatable element 2 comprises two discrete chambers 5 and 6. In the arrangement illustrated in FIG. 1, the right-hand chamber 5 is configured for inflation so as to provide a curtain lying adjacent the front side-window of the vehicle, whilst the left-hand chamber 6 is configured for inflation to form a curtain lying adjacent the rear side-window of the vehicle. The two discrete chambers 5 and 6 are interconnected by an elongate flow passage 7 running parallel with and adjacent to the roof structure 4 of the motor vehicle.

In a manner known, the inflatable element 2 may be formed from two sheets of fabric which are interconnected by seams or, alternatively, by using a one-piece weaving technique in which two sheets of fabric are woven s simultaneously. The sheets of fabric in selected regions are co-woven to form, in those selected regions, a single sheet of fabric. It will therefore be appreciated that each discrete chamber 5 and 6 is defined between two sheets of fabric. As illustrated in FIG. 1, the interior volume of each discrete chamber 5 and 6 is further sub-divided into a plurality of inflatable zones 8. The plurality of inflatable zones 8 may, for example, be defined by lines 9 of stitching between the two layers of fabric forming the inflatable element 2. Alternatively, the discrete inflatable zones 8 could be defined by co-woven regions of the fabric.

An inflator or gas generator 10 is provided, the inflatable gas generator 10 being located within the roof structure 4 of the motor vehicle. A gas-supply duct 11 extends from the gas generator 10 through a curved fabric inlet sleeve 12 of the inflatable element 2, and terminates at an end 13 located inside the interior volume of the inflatable element 2. As will be described in more detail, the gas supply duct 11 is configured to direct a flow of gas 14 from the gas generator 10 towards and into the forwardmost (right-hand) chamber 5, and also to direct a separate flow of gas 15 from the gas generator 10 towards the rearward (left-hand) chamber 6.

Figure 2:
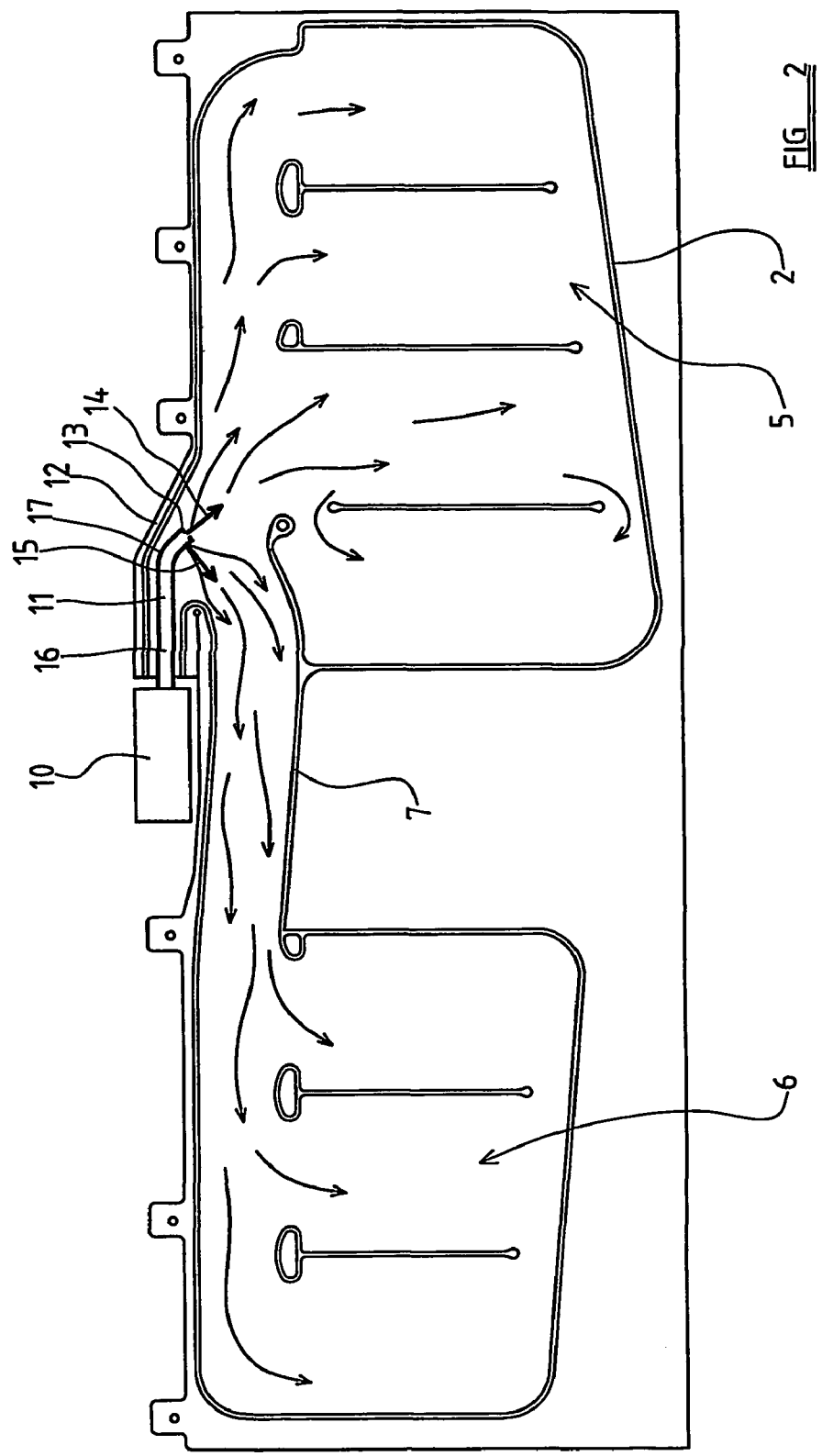
FIG. 2 is an enlarged side view of the air-bag arrangement of the present invention, illustrating the flow of gas during inflation.
Figure 3:
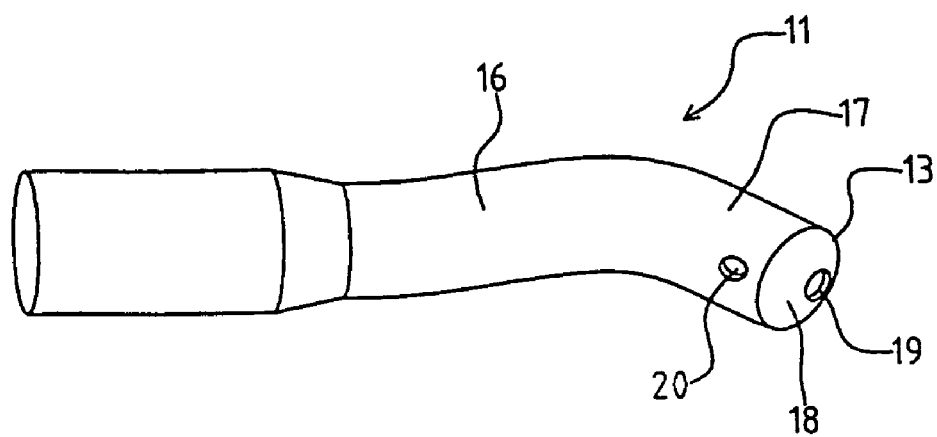
FIG. 3 is an enlarged perspective view of part of the air-bag arrangement illustrated in FIG. 2.

As illustrated more clearly in FIGS. 2 and 3, the gas supply duct 11 takes the form of a generally elongate rigid tube having a slightly bent or curved configuration so as to define a first substantially linear region 16 arranged to extend generally parallel to the axis of the flow passage 7, and a second substantially linear region 17 angled at approximately 45° to the first substantially linear region 16. Therefore, it will be seen from FIGS. 1 and 2, that the gas supply duct 11 is configured to extend away from the gas generator 10 within the roof structure 4 of the motor vehicle, and then to turn so as to extend downwardly into the interior volume of the inflatable element 2.

The end 13 of the gas-supply duct 11 is partially closed by an end wall 18. However, the end wall 18 is provided with an outlet aperture 19 therethrough, to permit the outflow of gas produced by the gas generator 10. Additionally, the side wall of the gas-supply duct 11, in the second linear region 17 thereof, is provided with a further outlet aperture 20. The aperture outlet 20 again is arranged to allow the outflow of gas from the gas-supply duct 11. The outlet aperture 20 is arranged to be substantially adjacent the end wall 18 and its associated outlet aperture 19.

The dimensions of the outlet aperture 19 formed in the end wall 18 of the gas-supply duct 11, are carefully selected so as to allow flow of gas therethrough, whilst also providing a throttling effect within the second linear region 17 of the gas supply duct 11. The diameter of outlet aperture 19 is smaller than the bore at the gas supply duct. Thus, as gas generated by the gas generator 10 passes along the gas-supply duct 11, some of the gas generated will be allowed to exit the gas-supply duct 11 through the end aperture 19. A turbulent flow of gas will also be triggered inside the end region of the gas-supply duct 11, which will ensure that a second flow of gas also exits the gas-supply duct 11 through the further outlet aperture 20 located in the side wall of the gas-supply duct 11.

As illustrated in FIG. 2, the end 13 of the gas-supply duct 11 enters the interior volume of the inflatable element 2 in a region generally above the junction between the gas flow passage 7 and the right-hand chamber 5. The flow of gas 14 exiting the end outlet aperture 19 is therefore directed towards the right-hand inflatable chamber 5. The flow of gas 15 exiting the side outlet aperture 20 is directed in an orthogonal direction, into the flow passage 7 to be directed by the flow passage 7 towards the left-hand inflatable chamber 6. It will therefore be seen that the single gas-supply duct 11 serves to direct gas in a first direction towards the right-hand inflatable chamber 5, and in a second, substantially orthogonal direction, towards the left-hand inflatable chamber 6.

In the configuration illustrated in FIG. 2, the gas-supply duct 11 is configured to direct the flow of gas 15 exiting through the side outlet aperture 20, in a direction at approximately 45° to the longitudinal axis of the flow passage 7. It will therefore be understood that the gas-supply duct 11 has been carefully configured so that neither the flow of gas 14 exiting through the end outlet aperture 19, nor the gas flow 15 exiting through the side aperture 20, impinges substantially perpendicularly on any part of the structure of the inflatable element 2, especially the peripheral seam of the inflatable element. This avoids the gas flow potentially damaging the structure of the inflatable element 2.

The above-described embodiment of the present invention has been found to be particularly advantageous because, as the second substantially linear region 17 of the gas-supply duct 11 is angled at only approximately 45° to the first substantially linear region 16, then the gas-supply duct 11 does not extend substantially into the inflatable element 2. As will clearly be seen from FIG. 2, this arrangement provides the desired directional flow of gas with the end 13 of the gas-supply duct 11 located near to the periphery of the inflatable element 2. This is particularly advantageous because it allows the inflatable element 2 to be folded up into a relatively thin package, without the need for the end 13 of the gas-supply duct 11 actually to extend into the folded package. A relatively thin folded inflatable element 2 has clear benefits in allowing a more compact installation, ready for deployment.

Figure 4:
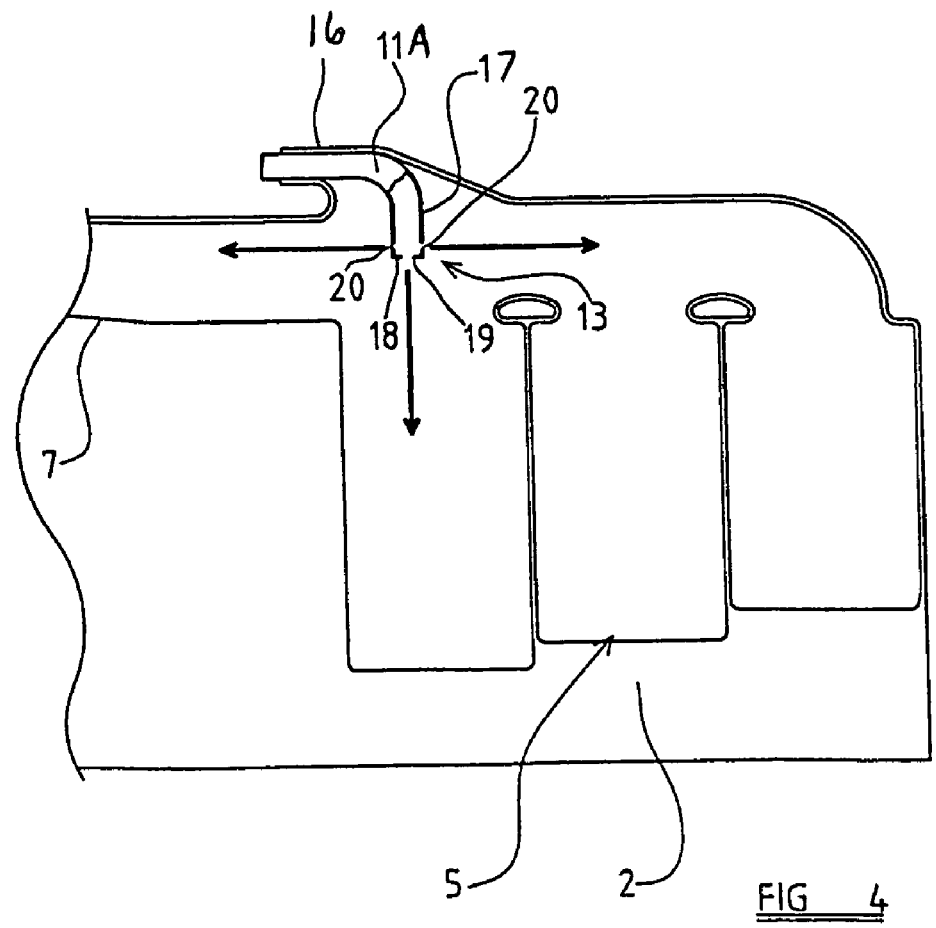
FIG. 4 is a view corresponding to part of FIG. 2, illustrating an alternative embodiment of the invention.

Turning now to consider FIG. 4, a slightly modified version of the gas-supply duct 11A is illustrated in which the first and second linear regions 16 and 17 of the gas-supply duct 11A are arranged to be substantially perpendicular to one another, thereby to give the gas-supply duct 11A a generally L-shaped configuration. In this arrangement, in addition to the end aperture 19 formed in the end wall 18 of the gas-supply duct 11A, two opposed side outlet apertures 20 are provided in the side wall of the gas-supply duct 11A. As illustrated in FIG. 4, this arrangement therefore provides a flow of gas substantially downwardly into the right-hand inflatable chamber 5, a flow of gas substantially axially along the flow passage 7 towards the left-hand inflatable chamber 6 (not illustrated in FIG. 4), and a further flow of gas towards the forwardmost region of the right-hand inflatable chamber 5. However, in this arrangement in which the gas-supply duct 11 A is bent or turned through an angle of approximately 90°, it is essential for the end 13 of the gas-supply duct 11A to be positioned further into the interior of the inflatable element 2, so as to prevent either of the flows of gas exiting through the side apertures 20 from aggressively impinging on the interior structure of the inflatable element at a position too close to the outlet apertures 20.

In each of the above-described embodiments, it should therefore be appreciated that the combination of an end outlet aperture 19 and one or more side outlet apertures 20 formed in the gas-supply duct 11 and 11A, serves to direct flows of gas out of the gas-supply duct along at least two paths substantially orthogonal to one another, which can therefore be directed towards different parts of the air-bag arrangement 1. This configuration of the gas-supply duct means that a single gas-supply duct, having a relatively simple construction, can be used to direct flows of gas towards the two discrete chambers 5 and 6 of the inflatable element 2.

While the above description constitutes the preferred embodiment of the present invention, it will be appreciated that the invention is susceptible to modification, variation and change without departing from the proper scope and fair meaning of the accompanying claims.

The invention claimed is:

1. An air-bag arrangement comprising an inflatable element and a gas generator configured to inflate the inflatable element, the inflatable element defining at least first and second chambers for inflation by a gas from the gas generator, a gas-supply duct being rigid and having an end-outlet aperture formed through an end-wall of the gas-supply duct so as to have a diameter smaller than the bore of the gas-supply duct, and at least one side-outlet aperture formed through a side-wall of the gas-supply duct at a position substantially adjacent the end-outlet aperture, the end-outlet being configured to direct gas out of the gas-supply duct in a first direction substantially orthogonal to a second direction of gas directed through the side-outlet aperture, wherein the gas-supply duct extends from the gas generator through an inlet sleeve of the inflatable element and into an interior volume of the inflatable element so as to direct gas from the gas generator to the first chamber through the end-outlet aperture, and direct gas from the gas generator to the second chamber through the side-outlet aperture.

2. An air-bag arrangement according to claim 1, wherein the gas-supply duct comprises a plurality of the side-outlet apertures formed in the side-wall.

3. An air-bag arrangement according to claim 2, wherein the plurality of side-outlet apertures is arranged to direct gas out of the gas-supply duct in a direction non-parallel with the direction of gas directed through the end-outlet aperture.

4. An air-bag arrangement according to claim 1, wherein the inflatable element defines a gas-flow passage interconnecting the first and second chambers, and wherein at least one of the end-outlet or side-outlet apertures is arranged to direct gas along the flow-passage.

5. An air-bag arrangement according to claim 4, wherein at one of the end-outlet and side-outlet apertures arranged to direct gas along the flow passage is arranged to direct said gas in a direction angled at approximately 45 degrees to the axis of the flow passage.

6. An air-bag arrangement according to claim 1, wherein the inflatable element is in the form of an inflatable curtain.

7. An air-bag arrangement according to claim 1, wherein the gas-supply duct has a curved or bent configuration.

8. An air-bag arrangement according to claim 7, wherein the gas-supply duct has first and second linear regions, the axis of the first linear region making an angle of approximately 45 degrees to the axis of the second linear region.

9. An air-bag arrangement according to claim 7, wherein the gas-supply duct has first and second linear regions, the axis of the first linear region making an angle of approximately 90 degrees to the axis of the second linear region.

* * * * *